No. 869,243. PATENTED OCT. 29, 1907.
A. S. HUBBARD & W. A. TURBAYNE.
ELECTRICAL SYSTEM OF DISTRIBUTION.
APPLICATION FILED MAR. 31, 1905.
2 SHEETS—SHEET 1.
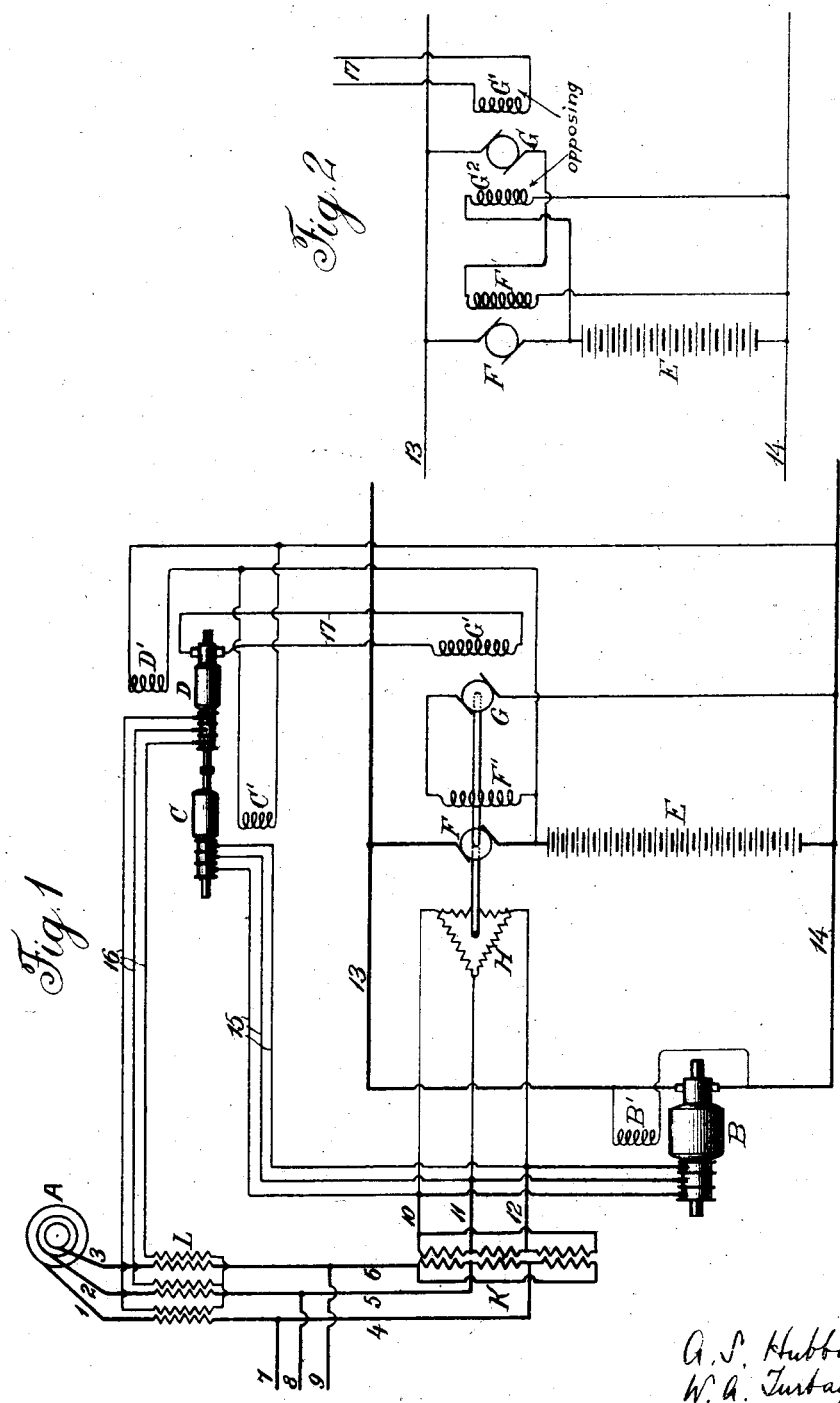

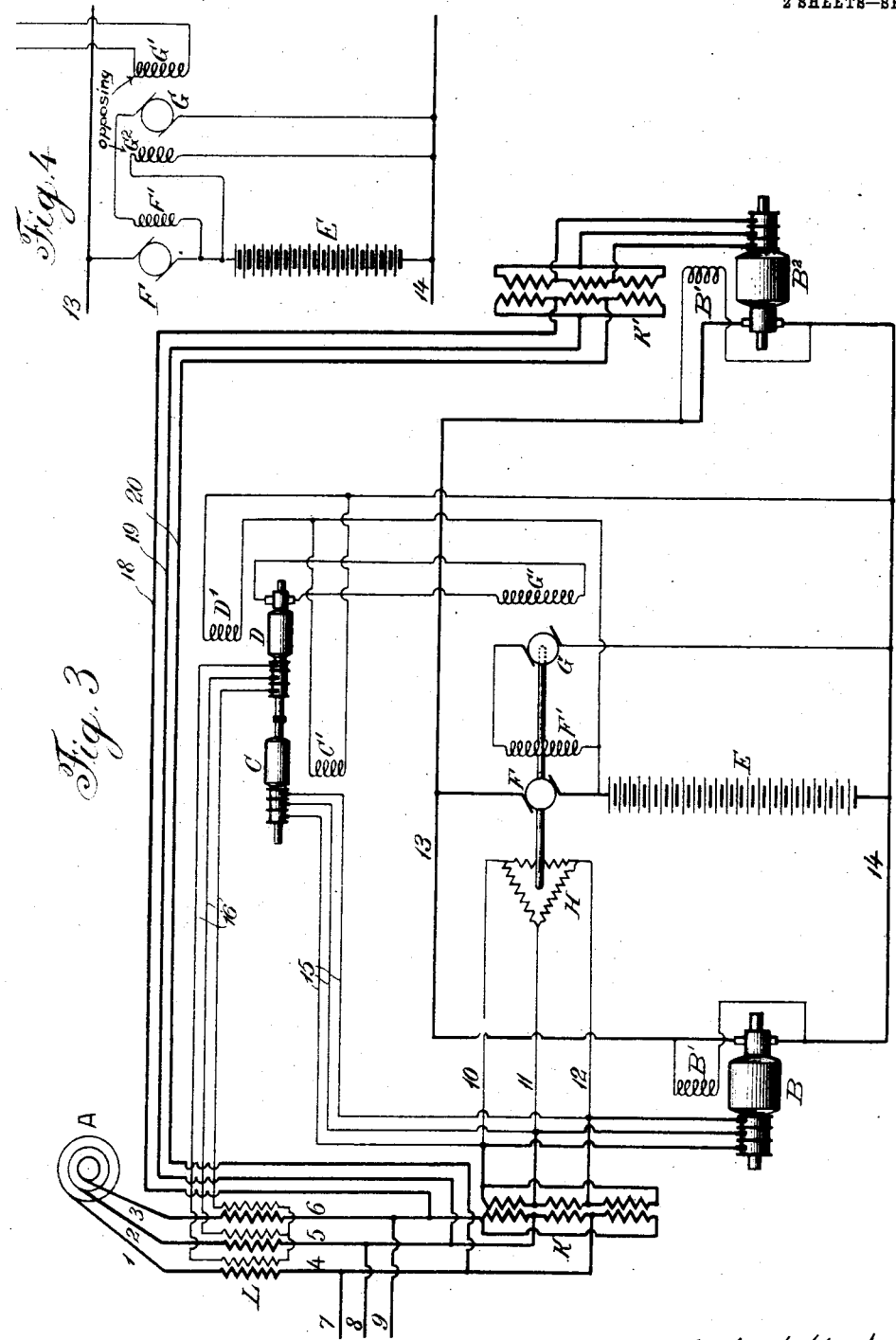

UNITED STATES PATENT OFFICE.

ALBERT S. HUBBARD, OF GREENWICH, CONNECTICUT, AND WILLIAM A. TURBAYNE, OF LANCASTER, NEW YORK, ASSIGNORS TO GOULD STORAGE BATTERY COMPANY, A CORPORATION OF NEW YORK.

ELECTRICAL SYSTEM OF DISTRIBUTION.

No. 869,242.  Specification of Letters Patent.  Patented Oct. 29, 1907.

Application filed March 31, 1905. Serial No. 253,107.

*To all whom it may concern:*

Be it known that we, ALBERT S. HUBBARD, a citizen of the United States, and a resident of Greenwich, in the county of Fairfield and State of Connecticut, and WILLIAM A. TURBAYNE, a citizen of the United States, and a resident of Lancaster, in the county of Erie, State of New York, have invented certain new and useful Improvements in the Art of Electrical System of Distribution, of which the following is a specification.

Our invention relates to electrical systems of distribution employing a branch circuit containing storage batteries to steady the load on the main generators, and automatic means for regulating the battery current to make the generator load constant within close limits.

It is one object of our invention to provide a system in which the battery may act to steady the load on an alternating current generator and be efficiently and accurately regulated from the alternating current circuit, whether the working circuit is on the alternating current side of the system or on the direct current side or whether there are work circuits on both sides of the system.

Another object of our invention is to so arrange the system that the direct current system may be fed from opposite sides of the battery and that the working circuits may be connected at any point while the battery is properly regulated to steady the load on the generators of the central station.

Still another object of our invention is to so improve that class of regulating apparatus for battery circuits in which the booster in series with the battery is regulated by means of a special dynamo whose E. M. F. is made to vary in accordance with fluctuations of current in the system, that closer regulation may be obtained and yet a smaller regulating dynamo be employed.

Referring to the drawings, Figures 1 and 3 illustrate diagrammatically systems embodying our invention;
Figs. 2 and 4 are diagrams illustrating modifications of the arrangement of the special dynamo and its circuit.

A is an alternating current generator having the circuit conductors 1, 2, 3. These conductors feed an alternating current circuit 7, 8, 9 and also conductors 4, 5, 6, connected to the primary of a transformer K, the secondary of which is connected by conductors 10, 11 and 12 to the rectifying device B, here indicated as a rotary converter having a shunt field winding B'. The rectifying device feeds the direct current circuit 13, 14 across which is the battery E and booster F. The particular form of rectifying device is not important, though if it is desired that the battery should at times take part of the load on circuit 7, 8, 9, as we prefer that it should do, the rectifying device should be reversible.

The booster F is preferably driven at approximately constant speed, and for this purpose we have indicated an induction motor H mechanically connected thereto and receiving its power from the secondary of transformer K.

F' is the field of the booster which is regulated by the resultant of two opposing potential differences, one of these opposing potential differences being that of a special dynamo G which is frequently known in the art as a counter electro motive force machine. This machine is in series with the booster field F'. The voltage on the latter and therefore the current therein and the voltage of the booster is dependent on the relation of the E. M. F. of G and the opposing potential differences across the terminals of the circuit G and F'.

G' is a field coil for the counter machine.

The current in the coil G' is made to vary in accordance with the condition of the alternating current circuit and preferably in direct accordance with the variations of current in the circuit 1, 2, 3. This we accomplish by providing a series transformer L, the primary of which is included in the circuit 1, 2, 3, while the secondary is connected by conductors 16, through the alternating current end of the rectifying device D, which, of course, is a comparatively small machine. The direct current end of this rectifying device is connected by conductors 17 to the terminals of the field winding G' so that the rectifying device or rotary converter D is an exciter for the counter machine G. To positively maintain synchronism this rectifying device D is mechanically connected to a synchronous motor C. C' and D' are the field coils respectively of the synchronous motor C and the rotary converter D. These field coils are excited through any suitable direct current source, the diagrams illustrating them as connected in shunt across the battery terminals.

It will be seen that any fluctuation of current on the alternating current generator, whether due to fluctuations of load on the alternating current work circuit 7, 8, 9, or to fluctuating load on the direct current side of the system, or to changes of battery condition, will correspondingly affect the current in the circuit 16 and in the circuit 17 thus varying the counter machine field in accordance with the changes of load on the alternating current generator. The variation of the counter machine field will cause the E. M. F. of the counter machine to vary accordingly and preferably this counter machine should be designed so that these variations of E. M. F. are from a point below that acting upon the circuit including F' and G to a point above that acting on said circuit, thus making the booster F reversible and varying its voltage in accordance with the load on the alternating current generator. Thus the voltage of the booster is primarily effected by changes of load on generator A acting through the rectifying device on the field G' of the counter machine. This regulation of the counter machine from the alternating current circuit, causing the booster field to vary in accordance with the current in the alternating current generator, produces a battery current that will maintain a substantial constancy of current of the alternating current generator despite fluctuations of load in the working circuit, and despite changes of condition of battery, in the same way that the storage batteries with boosters have heretofore been used to steady the load on direct current generators. Thus assume that the system is adjusted so that at a given average current from generator A the booster F has no voltage and the battery neither charges nor discharges. An increase of current from the generator A will cause the change of voltage, already described, upon the counter machine G and thereby produce an electro-motive-force in the booster armature F that will add itself to the electro-motive-force of the battery and so cause a discharge of the battery. This discharge will pass through the converter B if the additional demand is caused by the work circuit 7, 8, 9. On the other hand, if the additional demand is caused by change of condition of a work circuit connected to the direct current side of the system, then the additional battery current will pass to that work circuit. In either case the battery takes nearly all of the increased demand leaving the current of the main generator but slightly changed. In the same way, a decrease of current from the generator A from the average to which the system is adjusted, by reducing the electro-motive-force of the counter machine G causes an electro-motive-force of the booster in a direction to oppose a discharge of the battery. Under these circumstances current from the generator will pass through the rotary converter B to charge the battery.

According to our present invention we accentuate this primary regulation in such a way as to enable closer regulation to be obtained by the use of a smaller counter machine. This purpose we effect by making use of the change of battery voltage resulting from a change of current in the battery to reinforce the regulating effect of the coil G'. Thus in Fig. 1 we have shown the counter machine and the booster field connected in a series across the terminals of the battery so that the battery voltage is the voltage that opposes the E. M. F. of generator G. Let us assume that the change of load of one or the other of the working circuits has caused a tendency of the generator A to increase in current. It is desired then that the booster F should act to raise the voltage of the battery branch. The first effect of the increase of current on the generator A is to cause an increase of current on the circuit 16, and therefore on the circuit 17 and in the coil G'. This varies the voltage on the counter machine G in such a direction as to act on the booster F so as to increase the effective voltage of the battery branch. This means that the current in battery E, if it is discharging, has been increased, or if it has been charging, has been decreased and this at once causes a change in the E. M. F. of the batteries themselves. As a result the E. M. F. opposing the E. M. F. of the counter machine G has been made to change by the operation of the counter machine in a direction opposite to that in which the E. M. F. of the counter machine changed, therefore, the change in the coil F' has been greater than the change in the counter machine alone but the change in the counter machine has been the primary cause of the greater change. This use of the battery circuit to cause a secondary regulating effect may, of course, be employed whether or not there is an alternating current supplied. It has been proposed in some booster systems to employ the battery as a source of regulation but if the battery be used as a primary source of regulation it can only be used if there is a tendency for the main generator to supply a voltage at the terminals of the battery circuit that falls as the load on the generator increases, and, moreover, even if so used the regulation is one that is defective in a number of respects which we need not go into here, but with our arrangement the characteristic of the circuits may be anything desired and the primary impulse is always given by the coil G' and the effect of this primary impulse is augmented by the resultant change of battery condition.

Fig. 2 represents a slightly different way of utilizing the resultant change of battery condition to augment the effect of the change of current in coil G'. In this case we have shown a second coil $G^2$ on the counter machine which coil is so wound that its current in this coil has an opposing effect on the counter machine G to that of the current in the coil G'. Preferably the coil G' has considerably more effect upon the counter machine G than does the coil $G^2$, the arrangement being such that the results are very similar to those of the arrangement of Fig. 1. Any change in the current of coil G' will cause a change of the E. M. F. acting upon the field F' and therefore a change in the booster F and a change in the current in the battery E. This change of current in the battery E will change its E. M. F. in a direction to augment the regulating effect primarily induced by the change in the coil G'.

Fig. 4 indicates this method carried a little further. In this case the coil $G^2$ is provided as in Fig. 2 and for the same purpose, but in addition thereto the circuit containing the counter machine G and the coil F' are connected across the battery terminals as in Fig. 1 so that the primary regulation afforded by the coil G' causes a secondary regulation in the same direction due to change in the opposing E. M. F. of the circuit containing the counter machine which is increased by the effect of the second winding $G^2$. It will be seen that by thus augmenting the regulating effect of changes in the coil G' the range of effective voltage that may be made to act upon the booster field F' is much increased and so this machine as well as the rectifier D and the transformer L and the energy taken by this machine from the generator A can be much decreased in size to obtain the same or closer regulation than in any systems of this general character heretofore proposed.

The secondary regulating effect produced by the drop of voltage of the battery, as above described, is always in the same direction and tends to magnify the primary effect caused by the regulating effects of the current output of the converter D. Moreover, this secondary regulation by change of battery electro-motive-force is advantageous in compensating for changes of battery condition. If the battery has become less charged the lower electro-motive-force developed by it magnifies the primary regulation so that the current of the main generator will not be substantially affected by the state of charge of the battery.

In Fig. 3 we have shown the system of Fig. 1 modified by the introduction of a second transmission circuit 18, 19, 20, which is brought through a suitable transformer K' to the alternating current end of a second rotary converter B² whose direct current end feeds the direct current conductors 13, 14. The battery branch E.F is connected to the conductors 13, 14 between the two rectifying devices B B². These rectifying devices are both fed from the same alternating current generator A and it is to be understood that they may be and preferably are a considerable distance apart. The booster F is regulated in the same manner as before, the transformer L being connected at a point where it will receive the current going from the generator whether that current is feeding the direct current system through one rectifying device or through the other. The result is that the conductors 13, 14 may be of great length and may be connected to feed working circuits at any point or points throughout their length so that the working circuits may be fed by either or both of the rectifying devices while despite any fluctuations in such working circuits the booster F will be regulated in accordance with the load on the alternating current generator A.

It will be seen from the foregoing description that while we have shown certain specific embodiments of our invention in order to fully describe the same and illustrate some of its advantages yet our invention is broader than such specific embodiments and we do not limit ourselves to the mere details thereof nor to the employment in a single system of all the features of our invention.

Having thus described our invention what we claim as new and desire to secure by Letters Patent is:

1. The combination of an alternating current generator, a circuit leading therefrom, means for transmitting electric energy from the alternating current circuit as direct current supplying a direct current circuit, a storage battery connected to said circuit, a rectifying device connected to the alternating circuit, means for causing the output from said rectifying device to vary in accordance with the electrical condition in the alternating circuit and means for causing the rectified current to vary the electro-motive-force impressed upon the direct current end of said transmitting means and thereby vary the battery action.

2. The combination of an alternating current generator and a circuit therefrom, means for transmitting electrical energy from said circuit to a direct current circuit, a storage battery in the latter circuit, a rectifying device responsive to variations of electrical condition in the alternating current circuit, and a coil receiving the output of said rectifying device and varying the electro-motive-force impressed upon the direct current end of said transmitting means to thereby vary the battery action.

3. The combination of an alternating current generator and a circuit therefrom, means for transmitting electrical energy from said circuit to a direct current circuit, a storage battery in the latter circuit, a rectifying device responsive to variations of electrical condition in the alternating current circuit, and a coil receiving the output of said rectifying device and varying the electro-motive-force impressed upon the direct current end of said transmitting means to thereby vary the battery action.

4. The combination of an alternating current generator and a generator circuit leading therefrom, a work circuit connected to the generator circuit, means for transmitting electric energy from the generator circuit into direct current, a direct current circuit supplied thereby, a battery connected in a branch across the latter circuit, a rectifying device connected to the said generator circuit between the generator and the work circuit connections, and means for causing the rectified current to regulate the electro-motive-force impressed upon the direct current end of said transmitting means to vary the battery action.

5. The combination of an alternating current generator and a generator circuit leading therefrom, a work circuit connected to the generator circuit, means for transmitting electric energy from the generator circuit into direct current, a direct current circuit supplied thereby, a battery connected in a branch across the latter circuit, a rectifying device connected to the said generator circuit between the generator and the work circuit connections, and a coil for regulating the electro-motive-force impressed upon the direct current end of said transmitting means connected with the direct current end of said rectifying device.

6. The combination of an alternating current generator and a generator circuit leading therefrom, a work circuit connected to the generator circuit, means for translating electric energy from the generator circuit into direct current, a direct current circuit supplied thereby, a battery connected in a branch across the latter circuit, a rectifying device connected to the said generator circuit between the generator and the work circuit connections, and a coil receiving the output of said rectifying device and regulating the electro-motive-force impressed upon the direct current end of said transmitting means.

7. The combination of an alternating current generator and a generator circuit leading therefrom, a work circuit connected to the generator circuit, means for transmitting electric energy from the generator circuit into direct current, a direct current circuit supplied thereby, a battery connected in a branch across the latter circuit, a transformer in the alternating current circuit located between the generator and the work circuit connections, a rectifying device connected to the secondary of said transformer, and a coil for regulating the electro-motive-force impressed upon the direct current end of said transmitting means affected by variations in the direct current output of said rectifying device.

8. The combination of an alternating current generator and a generator circuit leading therefrom, a work circuit connected to the generator circuit, means for transmitting electric energy from the generator circuit into direct current, a direct current circuit supplied thereby, a battery connected in a branch across the latter circuit, a rectifying device connected to the said generator circuit between the generator and the work circuit connections, means for maintaining said rectifying device in synchronism, and a coil for regulating the battery current affected by the variations in the direct current output of said rectifying device.

9. The combination of an alternating current generator, two rectifying devices fed thereby, a direct current circuit connected to both of said rectifying devices, a battery in a branch connected across said direct current circuit and between said rectifying devices, and means for regulating the battery current by the electric condition of the alternating current circuit.

10. The combination of an alternating current generator, two rectifying devices fed thereby, a direct current circuit connected to both of said rectifying devices, a battery in a branch connected across said direct current circuit and between said rectifying devices, a rectifying device receiving current from the alternating current circuit, and a coil for regulating the battery current affected by variations in the direct current output of said rectifying device.

11. The combination of an alternating current generator, two rectifying devices fed thereby, a direct current circuit connected to both of said rectifying devices, a battery in a branch connected across said direct current circuit and between said rectifying devices, a rectifying device receiving an alternating current varying in accordance with the variations of load on the alternating current generator, and a regulating coil for the battery affected by variations in the direct current output of said rectifying device.

12. The combination of an alternating current generator and a generator circuit leading therefrom, a work circuit connected to the generator circuit, means for transmitting electric energy from the generator circuit into direct current, a direct current circuit supplied thereby, a battery, connected in a branch across the latter circuit, a booster in the battery branch, a rectifying device connected to the said generator circuit between the generator and the work circuit connections, and means for causing the rectified current to regulate the E. M. F. of the booster.

13. The combination of an alternating current generator and a circuit therefrom, means for transmitting electric energy from said circuit to a direct current circuit, a storage battery and a booster in a branch across the direct current circuit, a rectifying device receiving current from the alternating current circuit that varies in accordance with the variations in load on the alternating current generator, and a coil for regulating the booster E. M. F. connected to the direct current end of said rectifying device.

14. The combination of an alternating current generator and a circuit therefrom, means for transmitting electric energy from said circuit to a direct current circuit, a storage battery and a booster in a branch across the direct current circuit, a rectifying device receiving current from the alternating current circuit that varies in accordance with the variations in the load on the alternating current generator, and a coil for regulating the booster E. M. F. receiving the direct current output of said rectifying device.

15. The combination of an alternating current generator and a circuit therefrom, means for transmitting electric energy from said circuit to a direct current circuit, a storage battery and a booster in a branch across the direct current circuit, a rectifying device receiving current from the alternating current circuit that varies in accordance with the variations in load on the alternating current generator, a field coil for said booster, a regulating dynamo in series with said field coil, a field coil for the regulating dynamo and means for controlling said regulating dynamo in accordance with the direct current generated by said rectifying device.

16. The combination of an alternating current generator and a circuit therefrom, means for transmitting electric energy from said circuit to a direct current circuit, a storage battery and a booster in a branch across the direct current circuit, a rectifying device receiving current from the alternating current circuit that varies in accordance with the variations in load on the alternating current generator, a field coil for said booster, a regulating dynamo in series with said field coil, and a field coil for the regulating dynamo connected to the rectifying device to receive the direct current output thereof.

17. The combination of an alternating current generator and a circuit therefrom, means for transmitting electric energy from said circuit to a direct current circuit, a storage battery and a booster in a branch across the direct current circuit, a rectifying device receiving the current from the alternating current circuit that varies in accordance with the variations in load on the alternating current generator, a field coil for said booster, a regulating dynamo in series with said field coil in a circuit connected to the terminals of the battery, a field coil for the regulating dynamo and means for controlling said regulating dynamo in accordance with the direct current generated by said rectifying device.

18. The combination of an alternating current generator and a circuit therefrom, means for transmitting electric energy from said circuit to a direct current circuit, a storage battery and a booster in a branch across the direct current circuit, a rectifying device receiving current from the alternating current circuit that varies in accordance with the variations in load on the alternating current generator, a field coil for said booster, a regulating dynamo in series with said field coil in a circuit connected to the terminals of the battery, and a field coil for the regulating dynamo connected to the rectifying device to receive the direct current output thereof.

19. The combination of an alternating current generator and a circuit therefrom, means for transmitting electric energy from said circuit to a direct current circuit, a storage battery and a booster in a branch across the direct current circuit, a rectifying device receiving current from the alternating current circuit that varies in accordance with the variations in load on the alternating current generator, a field coil for said booster, a regulating dynamo connected across the battery terminals, and a second field coil for said regulating dynamo connected to the rectifying device to receive the direct current output thereof.

20. The combination of an alternating current generator and a circuit therefrom, means for transmitting electric energy from said circuit to a direct current circuit, a storage battery and a booster in a branch across the direct current circuit, a rectifying device receiving current from the alternating current circuit that varies in accordance with the variations in load on the alternating current generator, a field coil for said booster, a regulating dynamo in series with said field coil in a circuit connected across the battery terminals, a field coil for said regulating dynamo connected across the battery terminals, and a second field coil for said regulating dynamo connected to the rectifying device to receive the direct current output thereof.

21. The combination of a source of electricity, a circuit fed thereby, a storage battery and a booster in series in a branch connected across said circuit, a field coil for said booster determining the electro-motive-force thereof, a regulating dynamo in series with said field coil in a circuit whose E. M. F. is dependent upon that across the battery, and a field coil for said regulating dynamo whose current strength is dependent upon the current strength of the said source of electricity.

22. The combination of a source of electricity, a circuit fed thereby, a storage battery and a booster in series in a branch connected across said circuit, a field coil for said booster, a regulating dynamo in series with said field coil in a circuit subjected to variations of E.-M. F. across the battery, a field coil for said regulating dynamo whose current strength is dependent upon the current strength of the said source of electricity, and a second field coil for said regulating dynamo connected across the battery terminals.

23. The combination of an alternating current generator and a circuit therefrom, means for transmitting electric energy from said circuit to a direct current circuit, a storage battery in a branch across the direct current circuit, a rotary converter to supply direct current for regulating the battery current, connected to receive an alternating current whose strength is dependent upon the strength of the current from the alternating current generator, and means for maintaining said rotary converter in synchronism with the alternating current generator.

24. The combination of an alternating current generator and a circuit therefrom, means for transmitting electric energy from said circuit to a direct current circuit, a storage battery and a booster in a branch across the direct current circuit, a rectifying device receiving current from the alternating current circuit, and a coil for regulating the booster E. M. F. connected to the direct current end of said rectifying device.

25. The combination of an alternating current generator, a rectifying device, a battery connected thereto, a booster in series with the battery, a coil for regulating the booster E. M. F. connected to receive current from the direct current side of the system, means for applying opposing potential differences thereto, and means for regulating one of said potential differences in accordance with changes of current of the alternating current generator.

26. The combination of an alternating current generator, a rectifying device, a battery connected thereto, a booster in series with the battery, a coil for regulating the booster E. M. F. connected to receive current from the direct current side of the system, means for applying a potential difference thereto that varies with that of the battery, and means for applying a variable and opposing potential difference thereto that is regulated in accordance with changes of current of the alternating current generator.

27. The combination of an alternating current generator, a rectifier, a storage apparatus and booster, connected to the direct current end of the rectifier, means for regulating the booster electro-motive-force responsively to changes of electrical condition of the alternating current side of the system, and means for driving the booster in synchronism with the alternating current generator.

28. The combination of an alternating current generator, a rectifier, a storage apparatus and booster, connected to the direct current end of the rectifier, a regulating dynamo controlling the booster electro-motive-force, means for regulating said dynamo responsively to changes of electrical condition of the alternating current side of the system, and an alternating current synchronous motor mechanically connected to the booster and the regulating dynamo.

In testimony whereof, we have signed our names to this specification, in the presence of two subscribing witnesses.

ALBERT S. HUBBARD.
WILLIAM A. TURBAYNE.

Witnesses as to Hubbard:
J. HOMER REED,
D. H. MCMICHAEL.

Witnesses as to Turbayne:
EDMUND M. MAW,
NORMAN M. GROVE.